(12) United States Patent
Park et al.

(10) Patent No.: US 10,560,168 B2
(45) Date of Patent: Feb. 11, 2020

(54) METHOD FOR MULTIUSER SUPERPOSITION TRANSMISSION IN WIRELESS COMMUNICATION SYSTEM, AND DEVICE THEREFOR

(71) Applicant: LG ELECTRONICS INC., Seoul (KR)

(72) Inventors: Haewook Park, Seoul (KR); Inkwon Seo, Seoul (KR); Hyungtae Kim, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/779,372

(22) PCT Filed: Nov. 25, 2016

(86) PCT No.: PCT/KR2016/013695
§ 371 (c)(1),
(2) Date: May 25, 2018

(87) PCT Pub. No.: WO2017/091029
PCT Pub. Date: Jun. 1, 2017

(65) Prior Publication Data
US 2019/0253118 A1      Aug. 15, 2019

Related U.S. Application Data

(60) Provisional application No. 62/260,320, filed on Nov. 26, 2015.

(51) Int. Cl.
*H04B 7/06* (2006.01)
*H04B 7/024* (2017.01)

(52) U.S. Cl.
CPC ........... *H04B 7/0626* (2013.01); *H04B 7/024* (2013.01)

(58) Field of Classification Search
CPC ............................ H04B 7/0626; H04B 7/024
See application file for complete search history.

(56) References Cited

U.S. PATENT DOCUMENTS

2016/0353457 A1* 12/2016 Park ...................... H04B 7/024

FOREIGN PATENT DOCUMENTS

WO   WO 2013/116987 A1   8/2013
WO   WO 2015-115737 A1   8/2015

OTHER PUBLICATIONS

3GPP, R1-155525, Downlink Control Signaling and CSI Feedback Enhancements for MUST, ZTE, 3GPP TSG RAN WG1 Meeting #82bis, Oct. 2015. (Year: 2015).*

(Continued)

*Primary Examiner* — Nader Bolourchi
(74) *Attorney, Agent, or Firm* — Birch, Stewart, Kolasch & Birch, LLP

(57) ABSTRACT

A method for multiuser superposition transmission (MUST) in a wireless communication system, and a device therefor are disclosed. Particularly, a method by which a first base station (eNodeB (eNB)) performs MUST involving joint transmission in a wireless communication system can comprise the steps of: receiving, from a MUST-paired near user equipment (UE), first channel state information (CSI) for the first eNB participating in the joint transmission; setting a parameter required to perform the MUST involving the joint transmission for the MUST-paired UE, on the basis of the first CSI and the second CSI for a second eNB participating in the joint transmission; and transmitting the parameter to the MUST-paired UE and the second eNB.

10 Claims, 19 Drawing Sheets

(56) References Cited

OTHER PUBLICATIONS

3GPP, R1-156633, CSI Feedback Enhancements for MUST, ZTE, 3GPP TSG RAN WG1 Meeting #83, Nov. 2015. (Year: 2015).*
3GPP, R1-156534, CSI enhancement to support multi-user superposition transmission , Intel Corporation , 3GPP TSG RAN WG1 Meeting #83, Nov. 2015. (Year: 2015).*
Innovative Technology Lab Co., "DL Control Signalling and CSI Enhancement for Multiuser Superposition Transmission", R1-157312, 3GPP TSG RAN WG1 Meeting #83, Anaheim, USA, Nov. 15-22, 2015, pp. 1-4.
LG Electronics, "Discussion on transmission parameters for MUST", R1-156889, 3GPP TSG RAN WG1 Meeting #83, Anaheim, USA, Nov. 15-21, 2015, pp. 1-5.
NEC, "On the need of CSI enhancements for MUST", R1-156672, 3GPP TSG RAN WG1 Meeting #83, Anaheim, USA, Nov. 16-20, 2015, pp. 1-4.

* cited by examiner

FIG. 7
(a)
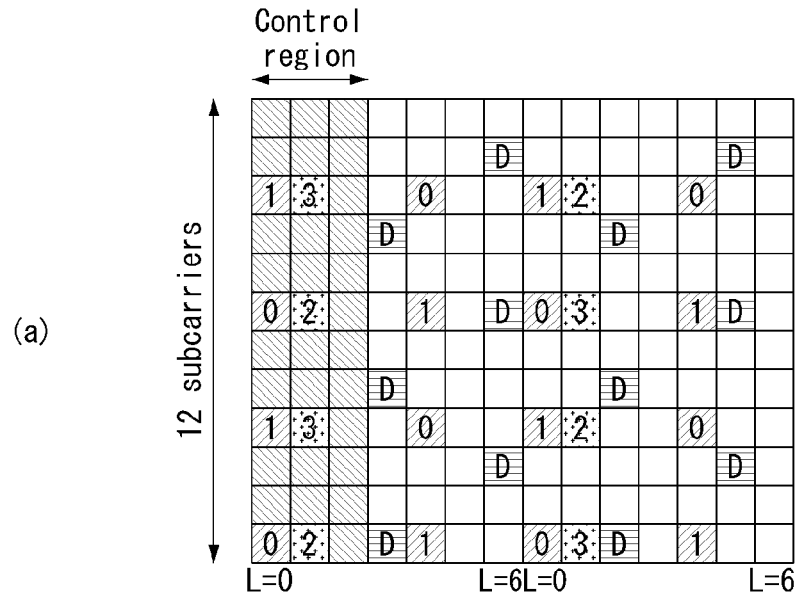
(b)
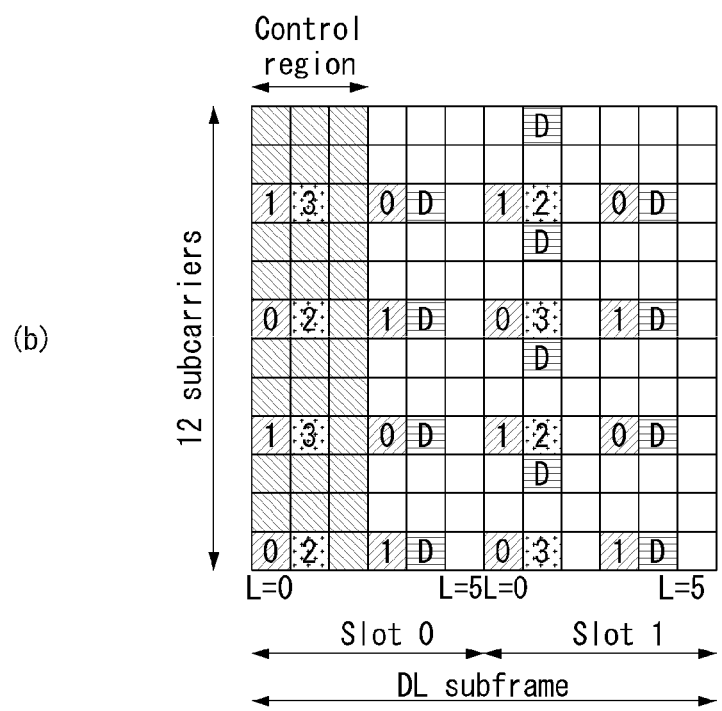

FIG. 8
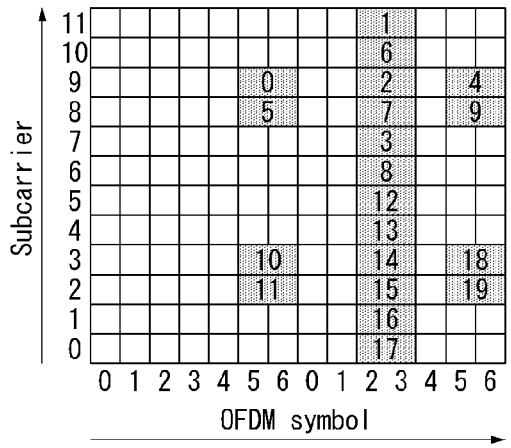
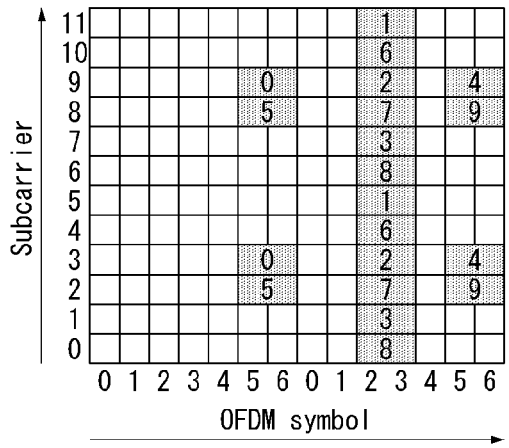
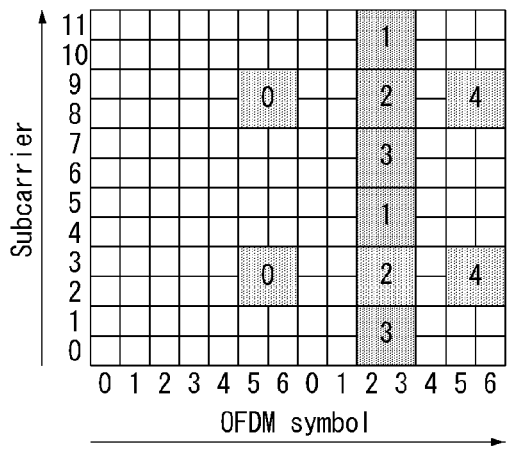

FIG. 12
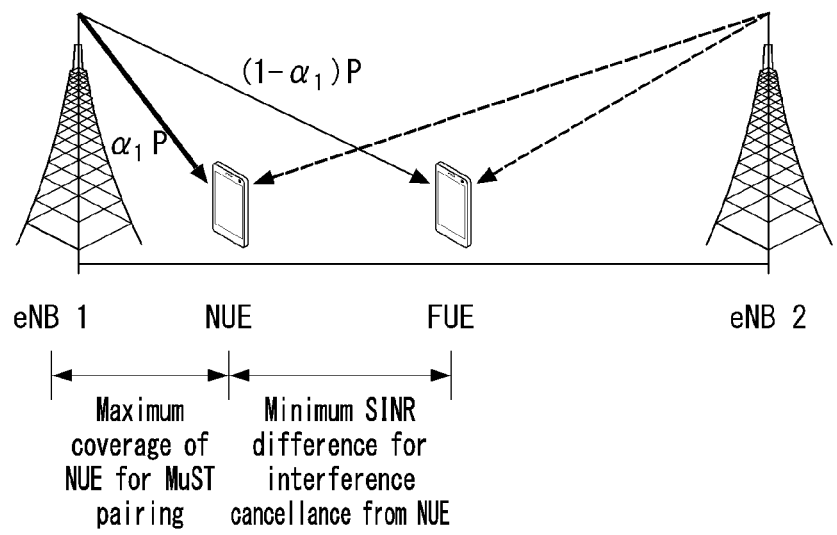
(a)
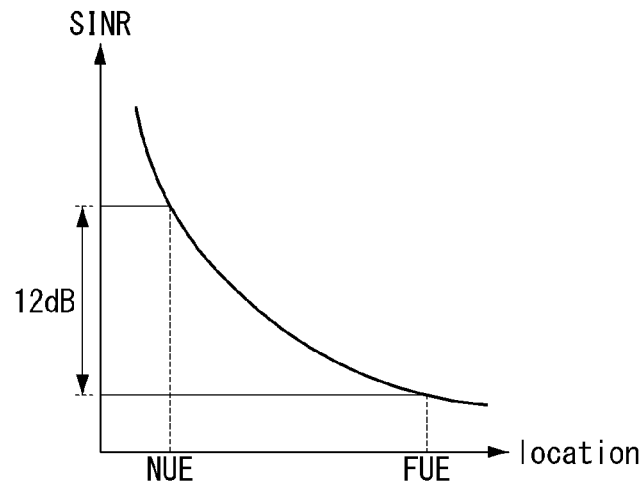
(b)

FIG. 13
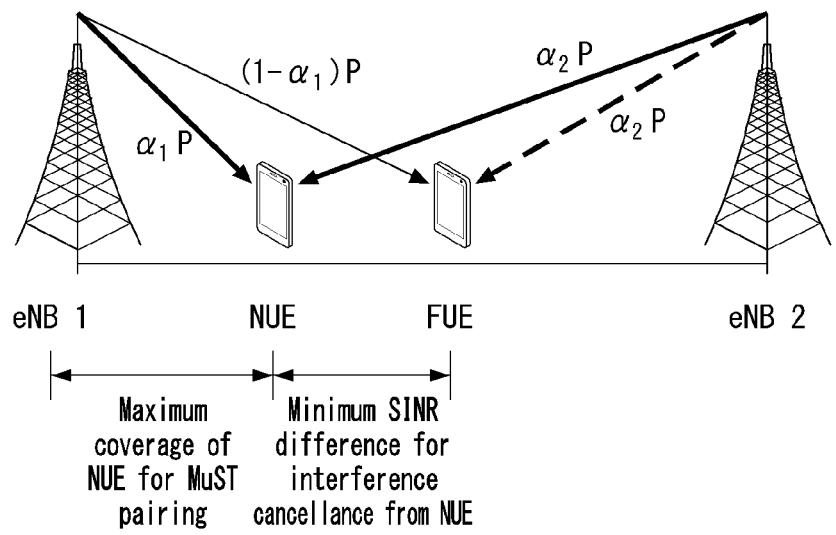
(a)
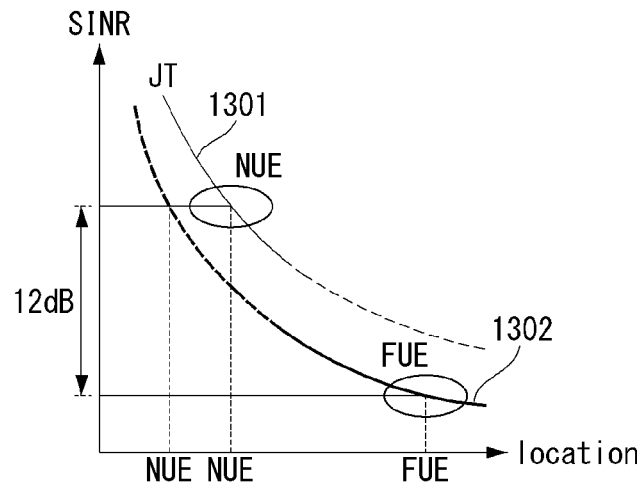
(b)

FIG. 15
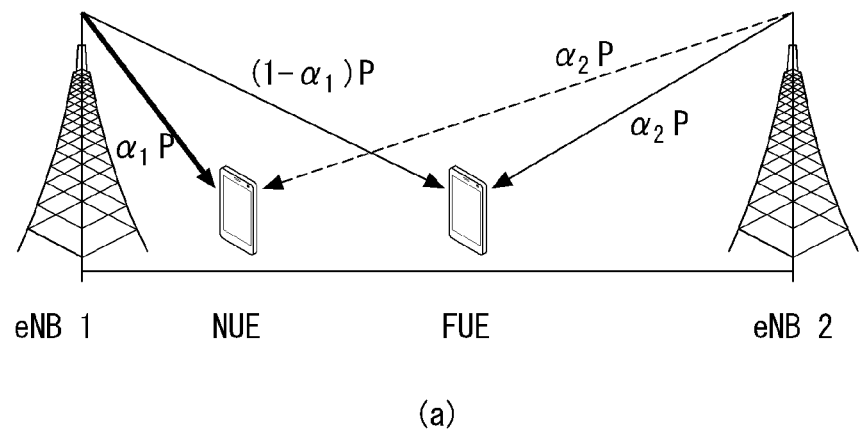
(a)
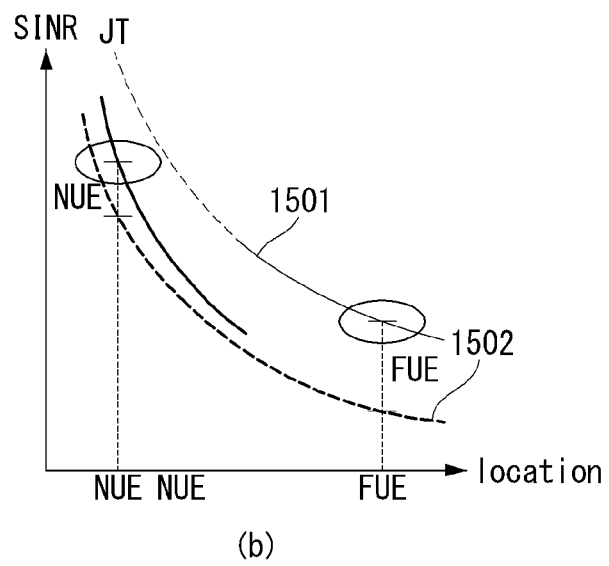
(b)

METHOD FOR MULTIUSER SUPERPOSITION TRANSMISSION IN WIRELESS COMMUNICATION SYSTEM, AND DEVICE THEREFOR

CROSS REFERENCE TO RELATED APPLICATIONS

This application is the National Phase of PCT International Application No. PCT/KR2016/013695, filed on Nov. 25, 2016, which claims priority under 35 U.S.C. 119(e) to U.S. Provisional Application No. 62/260,320, filed on Nov. 26, 2015, all of which are hereby expressly incorporated by reference into the present application.

TECHNICAL FIELD

The present invention relates to a wireless communication system and, more particularly, to a method for performing cooperation transmission (e.g., joint transmission)-involving multiuser superposition transmission (MUST) from multiple cells and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for performing MUST involving cooperative transmission (e.g., joint transmission) from multiple cells in order to transmit downlink data to a MUST-paired UE.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a first eNodeB (eNB) to perform joint transmission-involving multiuser superposition transmission (MUST) in a wireless communication system may include receiving first channel state information (CSI) of a first eNB participating in joint transmission from a MUST-paired near user equipment (UE), configuring a parameter necessary to perform MUST involving joint transmission in the MUST-paired UE based on the first CSI and second CS of a second eNB participating the joint transmission, and transmitting the parameter to the MUST-paired UE and the second eNB.

In another aspect of the present invention, a first eNodeB (eNB) for performing joint transmission-involving multiuser superposition transmission (MUST) in a wireless communication system includes a radio frequency (RF) unit for transmitting/receiving a radio signal and a processor controlling the RF unit. The processor may be configured to receive first channel state information (CSI) of a first eNB participating in joint transmission from a MUST-paired near user equipment (UE), configure a parameter necessary to perform MUST involving joint transmission in the MUST-paired UE based on the first CSI and second CS of a second eNB participating the joint transmission, and transmit the parameter to the MUST-paired UE and the second eNB.

Preferably, the second CSI may be received from the MUST-paired UE or the second eNB.

Preferably, an indicator indicating whether the MUST involving joint transmission is applied to a UE (FUE: far UE) remote from the first eNB or to a near UE (NUE) from the first eNB among the MUST paired UEs.

Preferably, the parameter may include one or more of a power allocation factor for performing the MUST involving joint transmission on the MUST-paired UE and a modulation and coding scheme (MCS) level.

Preferably, the parameter may further include a precoding matrix for performing the MUST involving joint transmission on the MUST-paired UE. The precoding matrix may be configured so that a signal to be jointly transmitted from the first eNB and the second eNB is constructively formed.

Preferably, the first CSI and the second CSI may include a precoding matrix indicator (PMI) indicating a precoding matrix for performing the MUST involving joint transmission on the MUST-paired UE. The PMI may indicate the precoding matrix so that a signal subjected to joint transmission from the first eNB and the second eNB is constructive.

Preferably, the first CSI and the second CSI may include a precoding matrix indicator (PMI) indicating a precoding matrix for performing the MUST involving joint transmission on the MUST-paired UE. The precoding matrix may be selected from a codebook except codeword enabling a signal subjected to joint transmission from the first eNB and the second eNB to be destructive.

Preferably, the parameter may be semi-statically transmitted.

Preferably, when a UE belonging to the MUST-paired UEs and to which the MUST involving joint transmission is applied is changed, the parameter may be transmitted.

Advantageous Effects

In accordance with an embodiment of the present invention, if a MUST-pairing probability is low because the number of active UEs is small, coverage of a UE near (near UE) a MUST-paired eNB can be improved using a MUST scheme involving joint transmission from multiple cells. Accordingly, the pairing probability of MUST can be improved and resultantly MUST performance can be improved.

Furthermore, in accordance with an embodiment of the present invention, if a MUST-pairing probability is sufficiently high because the number of active UEs is many, downlink reception performance of a UE far from (far UE)

a MUST-paired eNB can be improved using the MUST scheme involving joint transmission from multiple cells.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 12 is a diagram illustrating a case where a MUST scheme is applied in a multi-cell system according to an embodiment of the present invention.

FIG. 13 is a diagram illustrating a MUST scheme using joint transmission from multiple cells for an NUE according to an embodiment of the present invention.

FIG. 15 is a diagram illustrating a MUST scheme using joint transmission from multiple cells for an FUE according to an embodiment of the present invention.

MODE FOR INVENTION

Figure 1:
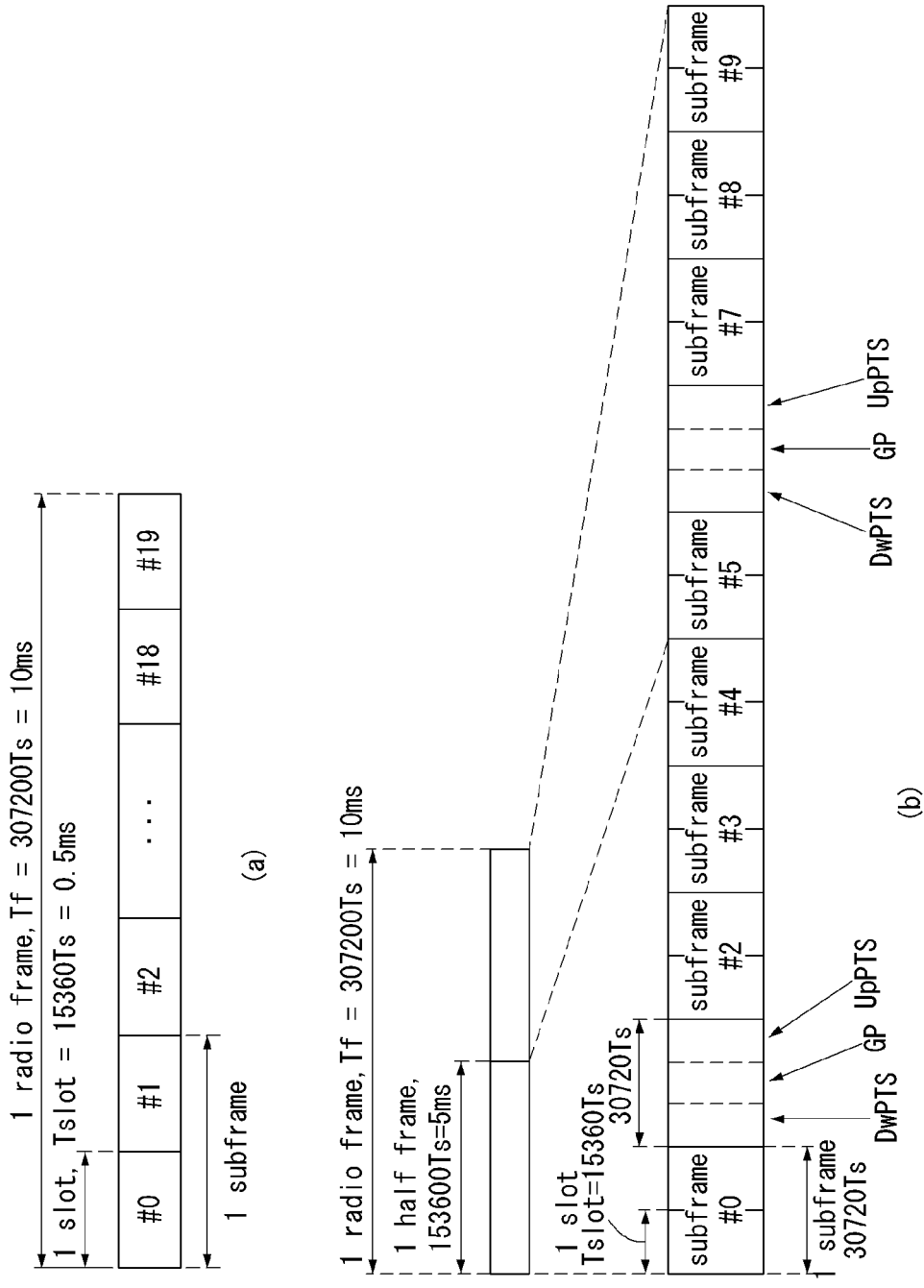
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-TDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1($a$) exemplifies a radio frame structure type 1. The type 1 radio frame may be applied to both of full duplex 1-DD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1($b$) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
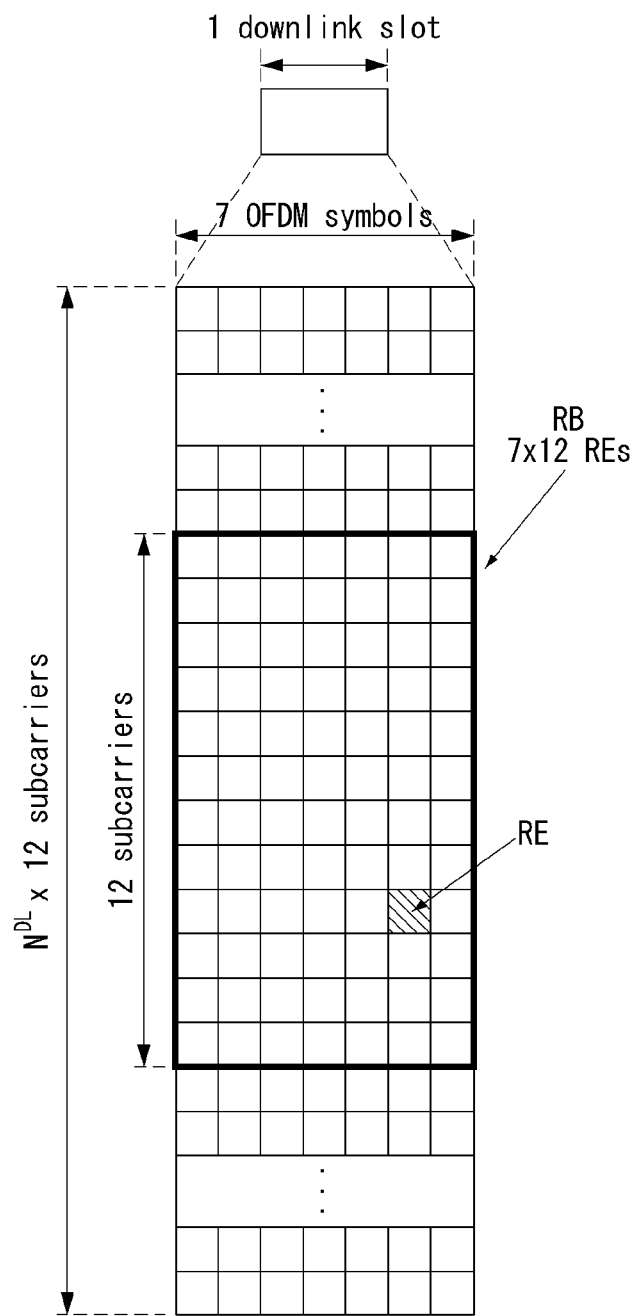
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
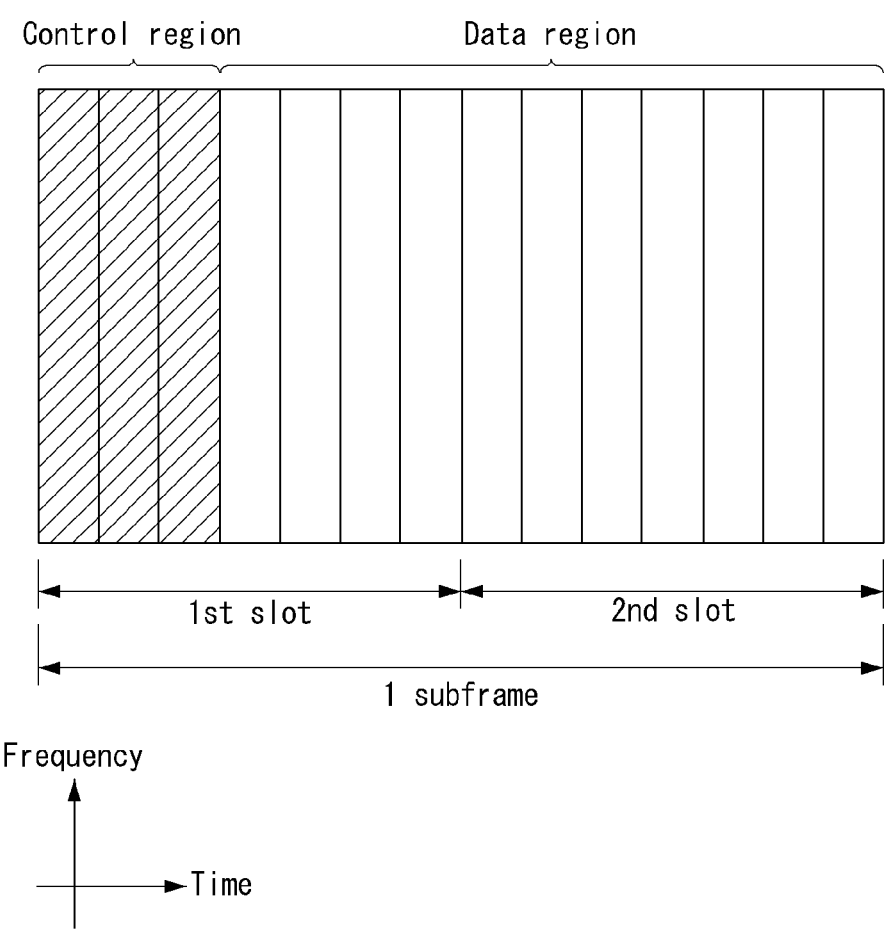
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining 01-DM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
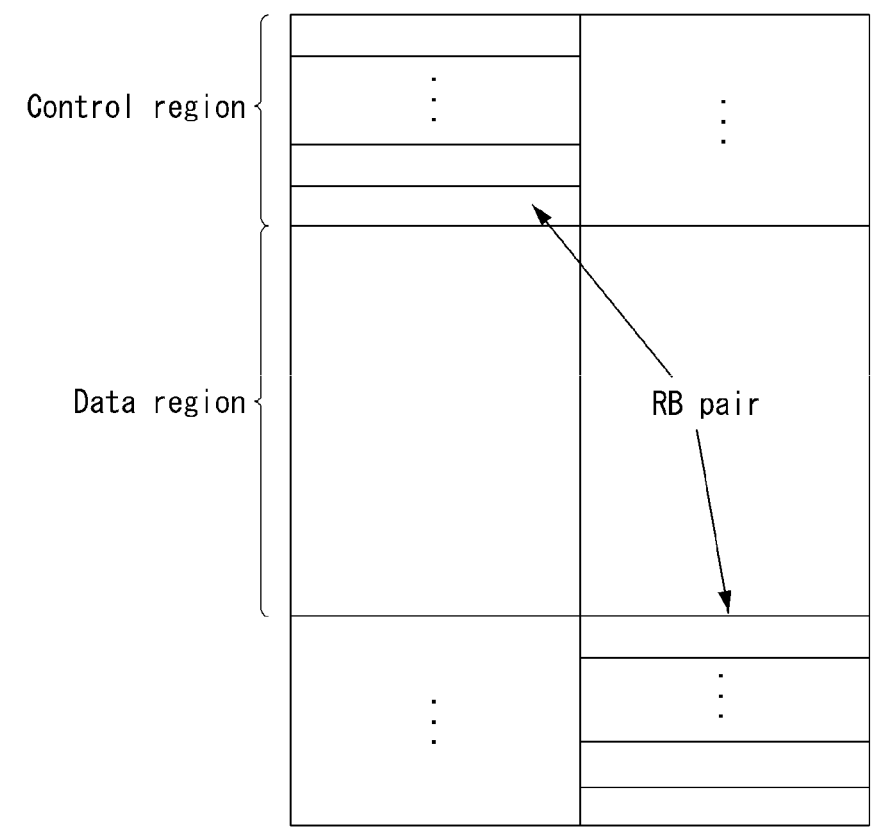
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
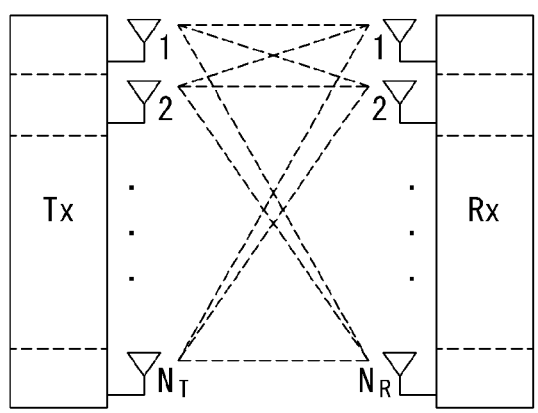
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T, \quad \text{[Equation1]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}[\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \Lambda, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
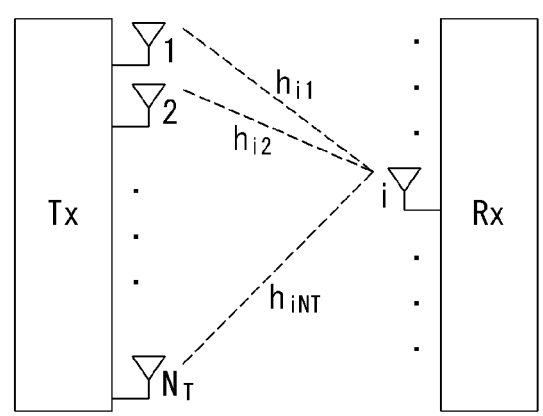
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \Lambda, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \Lambda, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \le \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval Δf=15 kHz.

In a subframe configured for CSI-RS transmission, a CSI-RS sequence is mapped to a complex-valued modulation symbol $a\_k,l^(p)$ used as a reference symbol on each antenna port p as in Equation 12.

$$a_{k,l}^{(p)} = w_{l''} \cdot r_{l,n_s}(m')$$ [Equation 12]

$$k = k' + 12m +
\begin{cases}
-0 & \text{for } p \in \{15,16\}, \text{ normal cyclic prefix} \\
-6 & \text{for } p \in \{17,18\}, \text{ normal cyclic prefix} \\
-1 & \text{for } p \in \{19,20\}, \text{ normal cyclic prefix} \\
-7 & \text{for } p \in \{21,22\}, \text{ normal cyclic prefix} \\
-0 & \text{for } p \in \{15,16\}, \text{ extended cyclic prefix} \\
-3 & \text{for } p \in \{17,18\}, \text{ extended cyclic prefix} \\
-6 & \text{for } p \in \{19,20\}, \text{ extended cyclic prefix} \\
-9 & \text{for } p \in \{21,22\}, \text{ extended cyclic prefix}
\end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

-continued $$w_{l''} = \begin{cases} 1 & p \in \{15, 17, 19, 21\} \\ (-1)^{l''} & p \in \{16, 18, 20, 22\} \end{cases}$$

$$l'' = 0,1$$

$$m = 0,1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | Number of CSI reference signals configured ||||||
| | 1 or 2 || 4 || 8 ||
| | (k', l') | $n_s$ mod 2 | (k', l') | $n_s$ mod 2 | (k', l') | $n_s$ mod 2 |
|---|---|---|---|---|---|---|
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame structure type 2 only | | | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \bmod T_{CSI-RS} = 0 \quad [\text{Equation 13}]$$

In Equation 13, T_CSI-RS means a CSI-RS transmission period, A_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.
  If the transmission mode 10 has been configured, a
    CSI-RS resource configuration identifier
  A CSI-RS port number (antennaPortsCount): a parameter
    (e.g., one CSI-RS port, two CSI-RS ports, four CSI-RS
    ports or eight CSI-RS ports) indicative of the number of
    antenna ports used for CSI-RS transmission
  A CSI-RS configuration (resourceConfig) (refer to Table
    3 and Table 4): a parameter regarding a CSI-RS allocation resource location
  A CSI-RS subframe configuration (subframeConfig, that
    is, I_CSI-RS) (refer to Table 5): a parameter regarding
    the period and/or offset of a subframe in which a
    CSI-RS will be transmitted
  If the transmission mode 9 has been configured, transmission power P_C for CSI feedback: in relation to the
    assumption of a UE for reference PDSCH transmission
    power for feedback, when the UE derives CSI feedback
    and takes a value within a [−8, 15] dB range in a 1-dB
    step size, P_C is assumed to be the ratio of energy per
    resource element (EPRE) per PDSCH RE and a CSI-RS EPRE.
  If the transmission mode 10 has been configured, transmission power P_C for CSI feedback with respect to
    each CSI process. If CSI subframe sets C_CSI,0 and
    C_CSI,1 are configured by a high layer with respect to
    a CSI process, P_C is configured for each CSI subframe
    set in the CSI process.
  A pseudo-random sequence generator parameter n_ID
  If the transmission mode 10 has been configured, a high
    layer parameter 'qcl-CRS-Info-r11' including a QCL
    scrambling identifier for a quasico-located (QCL) type
    B UE assumption (qcl-ScramblingIdentity-r11), a CRS
    port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is ρ_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Non-Orthogonal Multiple Access (NOMA)

The conventional OFDMA system employs a method of allocating a resource to each UE from a different frequency-time region (that is, an orthogonal radio resource) to support multiple users. On contrary, non-orthogonal multiple access (NOMA) refers to a multiple access technique by which the same frequency-time resource is allocated to a plurality of UEs with a pre-considered power ratio on the premise of an intervention cancellation receiver and pre-considered user-to-user intervention is reduced, thereby achieving great bandwidth efficiency. In other words, signals from two or more UEs are transmitted to the same resource, but the transmission is made using appropriate power and an appropriate transmission rate, and therefore, every UE is capable of decoding a desired signal. As such, since a plurality of UEs share the same frequency-time resource, there is a need of an algorithm by which a transmitter performs intervention cancellation (that is, another UE's signal to which the same resource is allocated).

Figure 9:
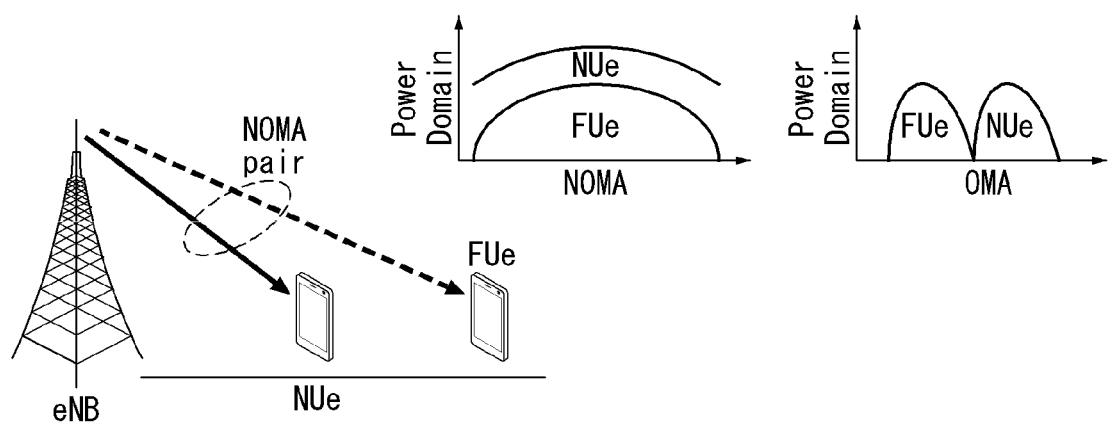
FIG. 9 illustrates the concept of an NOMA transmission scheme in a wireless communication system to which the present invention may be applied.

FIG. 9 illustrates the concept of an NOMA transmission scheme in a wireless communication system to which the present invention may be applied.

To a plurality of UEs having a great difference in channel quality (e.g., a UE (Near UE, NUe, in FIG. 9) located in a cell central region and a UE (Far UE, FUe, in FIG. 9) located in a cell edge region), a base station transmits respective data symbols in a superposition manner. The plurality UEs to which data symbols are transmitted from the same radio resource in the superposition manner may be referred to as a NOMA pair.

In this case, low power may be allocated to the NUe, and high power may be allocated to the FUe. In other words, in the orthogonal multiple access (OMA) scheme, the same power is allocated to the NUe and the FUe. On the other hand, according to the NOMA scheme, when the total power is assumed to be p, ⅕p may be allocated to the NUe and ⅘p may be allocated to the FUe.

In this case, according to a Successive Interference Cancellation (SIC) technique, the NUe may first decode and cancel a strong interference signal of the FUe, and then decode its own signal successfully.

Then, since the interference signal of the cell central UE reaches the FUe with relatively less power, the FUe may regard the interference signal as interference and decode its own signal.

Major techniques for the NOMA system may be largely classified into a base station's resource allocation technique and a UE's interference cancellation technique. Among these, the UE's interference cancellation technique may have types as below:

Symbol-level Interference Cancellation (SIC) receiver

Maximum Likelihood (ML) receiver

Codeword level interference Cancellation (CWIC) receiver

Minimum Mean Square Error (MMSE) based L-CWIC (Linear CWIC)

ML-CWIC

A different gain is achieved in a give environment depending on each type of interference cancellation technique, and, generally a higher gain is achieved in the case where the ML technique is applied in proportion to complexity of UE implementation and in the case where CWIC-type receiver is applied.

Hierarchical Modulation

Hierarchical modulation (or layered modulation) is one of technologies for multiplexing and modulating multiple data streams into a single symbol stream, and a sub-symbol of a base layer (that is, where a low-level modulation technique is applied) and a sub-symbol of an enhancement layer (that is, where a high level modulation technique is applied) are synchronously superimposed before being transmitted.

Figure 10:
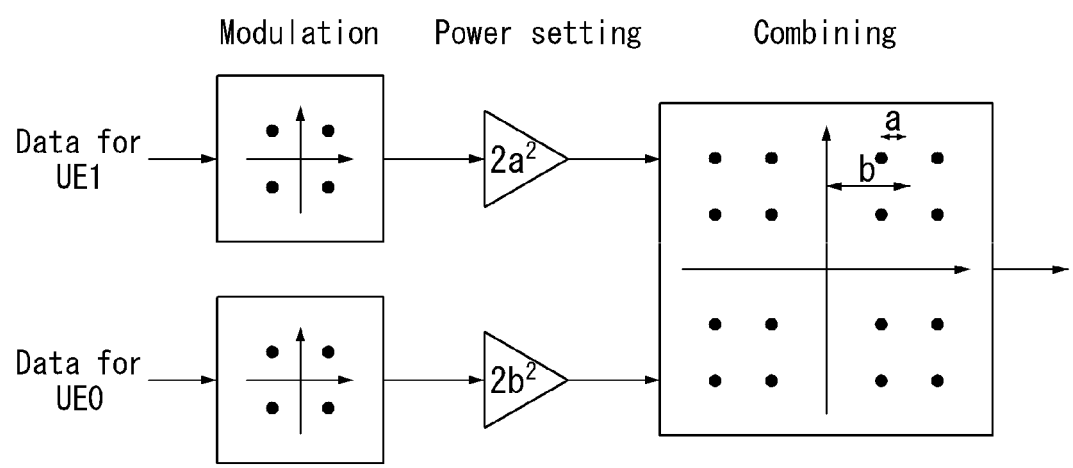
FIG. 10 is a diagram illustrating hierarchical modulation in a wireless communication system to which the present invention can be applied.

FIG. 10 is a diagram illustrating an example of hierarchical modulation in a wireless communication system in which the present invention can be applied.

When the hierarchical modulation is used, a user in a good receiving condition or an advanced receiver may demodulate and decode one or more data streams. On the other hand, a conventional receiver or a receiver in a poor receiving condition may demodulate and decode only embedded data streams in a low layer(s) (e.g., the base layer).

Theoretically, hierarchical modulation is regarded as one of practical implementations of superposition precoding, and has been proposed to achieve a maximum sum rate of a Gaussian broadcast channel with interference cancellation in a receiver. In light of network operation, a network operator may seamlessly target a service having QoS or a different service when hierarchical modulation is used. However, traditional hierarchical modulation is affected by inter-layer interference (ILI) and thus dented by interference from a signal(s) with a high rate which is achievable using a low-layer data stream (e.g., a base-layer data stream). For example, in the case of two-layer symbol that is hierarchically modulated with a 16 Quadrature Amplitude Modulation (QAM) base layer and a Quadrature Phase Shift Keying (QPSK) enhancement layer, when the entire signal-to-noise (SNR) ratio is approximately 23 dB, a loss in the base-layer throughput may be approximately 1.5 bit/symbol due to inter-layer interference. This amounts to approximately 37.5% (1.5/4) of an achievable throughput of the base layer with a SNR of 23 db. Meanwhile, a demodulation error rate of any one of a base-layer symbol and an enhancement-layer symbol is increased as well. Accordingly, it is actively being discussed to recover performance loss of hierarchical modulation.

Furthermore, due to simple a diversity gain and high spectral efficiency, accompanying with simple design of a receiver, multicarrier transmission (e.g., OFDM) is broadly used not just as a next-generation wireless network, but also in a broadcast multicast service (BCMCS).

However, especially in the case of modulation by high-order signal constellation, advantages of the OFDM are counter-balanced by a high peak-to-average-power ratio (PAPR).

A high PAPR of a signal modulated by the transmitter dramatically reduces an average output power of a high power amplifier (HPA) due to back-off. In addition, a receiver increases demodulation and decoding errors, thereby limiting a throughput of the whole transceiver chain. Thus, it is important to understand how hierarchical modulation affects a PAPR of multicarrier modulation.

Precoding

A precoder receives a vector's block $x(i)=[x^{(0)}(i) \ldots x^{(\nu-1)}(i)]^T$ ($i=0,1, \ldots, M_{symb}^{layer}-1$) from layer mapping, and generates a vector's block $y(i)[ \ldots y^{(p)}(i) \ldots ]^T$ ($i=0,1, \ldots, M_{symb}^{ap}-1$) to be mapped to a resource on each antenna port. In this case, $y^{(p)}(i)$ denotes a signal for an antenna port p. $M_{symb}^{layer}$ denotes the number of demodulation symbols to be transmitted per layer for a physical channel. $M_{symb}^{ap}$ denotes the number of demodulation symbols to be transmitted per antenna port for a physical channel Pre-Coding for Transmission on a Single Antenna Port For transmission on a single antenna port, precoding is defined as Equation 14, as below.

$$y^{(p)}(i)=x^{(0)}(i) \quad \text{[Equation 14]}$$

In this case, $p \in \{0,4,5,7,8\}$ is the number of a single antenna port used for transmission of a physical channel, and $i=0,1, \ldots, M_{symb}^{ap}-1$, $M_{symb}^{ap}=M_{symb}^{layer}$.

Precoding for Spatial Multiplexing Using an Antenna Port with a Cell-Specific Reference Signal Precoding for spatial multiplexing using an antenna port accompanying a cell-specific reference signal is used in combination with layer mapping for spatial multiplexing. Spatial multiplexing supports two or four antenna ports, and used set of antenna ports are $p \in \{0,1\}$ and $p \in \{0,1,2,3\}$.

Precoding without Cyclic Delay Diversity (CDD)

Precoding for spatial multiplexing without CDD is defined as Equation 15, as below.

$$\begin{bmatrix} y^{(0)}(i) \\ M \\ y^{(P-1)}(i) \end{bmatrix} = W(i) \begin{bmatrix} x^{(0)}(i) \\ M \\ x^{(\nu-1)}(i) \end{bmatrix} \quad \text{[Equation 15]}$$

In this case, a precoding matrix W(i) has size of P×ν, and $i=0,1, \ldots, M_{symb}^{ap}-1$, $M_{symb}^{ap}=M_{symb}^{layer}$.

For spatial multiplexing, a value of W(i) is selected from among precoder elements in a codebook which is set in an eNB and a UE. Using codebook subset restriction, the eNB may restrict selection of a precoder in a UE to a subset element in the codebook. The set codebook is selected from the following Table 7 or Table 8.

Precoding for Large-Delay CDD

For large-delay CDD, precoding for spatial multiplexing is defined as in Equation 16, as below.

$$\begin{bmatrix} y^{(0)}(i) \\ M \\ y^{(P-1)}(i) \end{bmatrix} = W(i)D(i)U \begin{bmatrix} x^{(0)}(i) \\ M \\ x^{(\nu-1)}(i) \end{bmatrix} \quad \text{[Equation 16]}$$

In this case, a precoding matrix W(i) has a size of P×ν, and $i=0,1, \ldots, M_{symb}^{ap}-1$, $M_{symb}^{ap}=M_{symb}^{layer}$. A matrix D(i), which supports CDD and has a diagonal size of ν×ν, and a matrix U, which has a size of ν×ν, are given according to the number of layers u from the following Table 6.

Values of the precoding matrix W(i) are selected from among precoder elements in a codebook which is configured in the eNB and the UE. Using codebook subset restriction, the eNB may restrict selection of a precoder in the UE to an element subset in the codebook. The set codebook is selected from the following Table 7 or Table 8.

In the case of two antenna ports, a precoder is selected according to W(i)=C_1. In this case, C_1 denotes a precoding matrix corresponding to a precoder index 0 in the following Table 7.

In the case of four antenna ports, the UE may assume that the eNB rotationally allocates different precoders to different vectors on a PDSCH as below. A different precoder may be used in each ν vector. In this case, ν denotes the number of transport layers in the case of spatial multiplexing. In particular, a precoder is selected according to W(i)=C_k.

In this case, k is a precoder index that is given according to $$k = \left(\left\lfloor \frac{i}{\nu} \right\rfloor \mod 4\right) + 1 \in \{1, 2, 3, 4\}.$$

In addition, C_1, C_2, C_3, and C_4 respectively denote precoder matrixes corresponding to precoder indexes 12, 13, 14, and 15 in the following Table 8.

Table 6 shows examples of large-delay CDD.

TABLE 6

| Number of layers $\upsilon$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Codebook for Precoding and CSI Reporting

For transmission on two antenna ports P∈{0,1}, and for CSR reporting based on two antenna ports P∈{0,1} or P∈{15,16}, the precoding matrix W(i) is selected from the following Table 7 or a subset thereof. For a closed-loop spatial multiplexing transmission mode, a code index 0 is not used when the number of layers is $\upsilon$=2.

Table 7 shows an example of a codebook for transmission on an antenna port {0,1} and for CSI reporting that is based on an antenna port {0,1} or {15,16}.

TABLE 7

| Codebook index | Number of layers $\upsilon$ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

For transmission on four antenna ports P∈{0,1,2,3}, the precoding matrix W is selected from the following Table 8 or a subset thereof. For CSI reporting based on four antenna ports P∈{0,1,2,3} or P∈ {15,16,17,18}, the precoding matrix W may be selected from the following Table 8 or a subset thereof. $W_n^{\{s\}}$ denotes a matrix that is defined by a column given by a set {S} from the equation $W_n = I - 2u_n u_n^H / u_n^H u_n$. In this case, I denotes a 4×4 unit matrix, and a vector $u_n$ is given from the following Table 8.

Table 8 shows an example of a codebook for transmission on an antenna port {0,1,2,3} and for CSI reporting that is based on antenna port {0,1,2,3} or {15,16,17,18}.

TABLE 8

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Coordinated Multi-Point Transmission and Reception (COMP)

In line with the needs of LTE-advanced, there was proposed CoMP transmission for the performance improvement of a system. CoMP is also called co-MIMO, collaborative MIMO or network MIMO. It is expected that CoMP will improve performance of a UE located at a cell edge and to improve the throughput of an average cell (sector).

In general, inter-cell interference deteriorates performance of a UE located at a cell edge and average cell (sector) throughput in a multi-cell environment in which a frequency reuse index is 1. In order to reduce inter-cell interference, in the LTE system, a simple and passive method, such as fractional frequency reuse (FFR), has been applied so that a UE located at a cell edge has a proper performance throughput in an interference-limited environment. However, a method of reusing inter-cell interference as a signal (desired signal) that needs to be received by a UE or reducing inter-cell interference instead of reducing the use of a frequency resource per cell has a better profit. In order to achieve the above object, a CoMP transmission method may be applied.

A CoMP method that may be applied to the downlink may be divided into a joint processing (JP) method and a coordinated scheduling/beamforming (CS/CB) method.

In the JP method, data may be used in each point (eNB) of a CoMP unit. The CoMP unit means a set of eNBs used in the CoMP method. The JP method may be subdivided into a joint transmission method and a dynamic cell selection method.

The joint transmission method means a method for a plurality of points, that is, all or some within a CoMP unit, to transmit signals through a PDSCH at the same time. That is, data transmitted to a single UE may be transmitted by a plurality of transmission points at the same time. Quality of a signal transmitted to a UE can be improved regardless of whether it is coherent or non-coherent and interference with another UE can be positively removed through such a joint transmission method.

The dynamic cell selection method means a method for a single point within a CoMP unit to transmit a signal through a PDSCH. That is, data transmitted to a single UE at a specific time is transmitted by a single point, and other points within the CoMP unit do not transmit data to the UE. The point that transmits data to the UE may be dynamically selected.

In accordance with the CS/CB method, a CoMP unit performs beamforming through cooperation in order to transmit data to a single UE. That is, only a serving cell transmits data to the UE, but user scheduling/beamforming may be determined through cooperation between a plurality of cells within the CoMP unit.

In the case of the uplink, CoMP reception means that a signal transmitted by cooperation between a plurality of geographically separated. A CoMP method that may be applied to the uplink may be divided into a joint reception (JR) method and a coordinated scheduling/beamforming (CS/CB) method.

The JR method means a method for a plurality of points, that is, all or some within a CoMP unit, to receive a signal transmitted through a PDSCH. In the CS/CB method, only a single point receives a signal transmitted through a PDSCH, but user scheduling/beamforming may be determined through cooperation between a plurality of cells within a CoMP unit.

Multiuser Simultaneous Transmission Using Joint Transmission (JT)

As described above, cooperative multipoint transmission/reception (CoMP) refers to a method in which two or more eNBs (or (access) points or cells) communicate with a specific UE through cooperation in order to further smooth communication between the specific UE and the eNBs (or (access) points or cells).

Hereinafter, in the description of the present invention, an eNB, an (access) point and a cell are used as the same meaning.

Furthermore, the CoMP method may be divided into a joint processing (JP) method and a coordinated scheduling/beamforming (CS/CB) method depending on whether data has been transmitted by eNBs that perform CoMP.

In the case of JP, data from eNBs performing CoMP to a UE is instantaneously transmitted to the UE at the same time. The UE combines the signals from the eNBs, thereby improving reception performance. In contrast, in the case of CS, data toward a single UE is instantaneously transmitted through a single eNB, and scheduling or beamforming are performed so that interference with an eNB having a different UE is minimized.

Hereinafter, the present invention proposes a multiuser simultaneous transmission method using the JP method.

A multiuser superposition transmission (MUST) system transmits information to different UEs that use the same time and frequency resource using a superposition coding scheme.

That is, a transmission signal s1 based on a modulation order to be applied to a signal for a UE1 having good geometry (near UE (NUe)) (e.g., a UE relatively close to an eNB or a UE not having an obstacle in the radio path between eNBs), and a transmission signal s0 based on a modulation order to be applied to a signal for a UE0 having poor geometry (far UE (FUe)) (e.g., a UE relatively far from an eNB or a UE having an obstacle in the radio path between eNBs) are superposed. The superposed signal is transmitted to each of the UEs.

FIG. 9 diagrams such a method. In FIG. 9, a NOMA pair may be substituted with a MUST pair.

In this case, a process for each UE to decode a received signal is as follows.

First, if rank-1 transmission is assumed, the received signal y_1 of a UE1 (NUE) may be expressed like Equation 17.

$$y_1 = H_1(\alpha p_1 s_1 + (1-\alpha)p_0 s_0) + n_1 \qquad \text{[Equation 17]}$$
$$= H_1 \alpha p_1 s_1 + H_1(1-\alpha)p_0 s_0 + n_1$$

In this case, H_1 is a channel between an eNB and the UE1, $\alpha$ (0<$\alpha$<1) is a power allocation factor for the UE1, $p_i$(i=0, 1) is a normalized precoding vector for an i-th UE, and n_1 is a Gaussian noise vector added to a signal transmitted to the UE1. s_i (i=0, 1) is a signal transmitted from the eNB to the i-th UE.

The normalized precoding vector consists of $\sqrt{P_{max}}p_i$ (in this case, $\|p_i\|=1$), and P_max is maximum power that may be transmitted by the eNB. Hereinafter, $\sqrt{P_{max}}=1$ is used unless described otherwise, for convenience of description of the present invention.

In this case, if $p_0=p_1$, it may be considered that the same beam restriction is taken into consideration.

The UE1 first decodes s_0, that is, the signal of the UE0, that is, a transmission signal having relatively great power, performs successive interference cancellation (SIC) for removing the signal from a received signal, and then decodes s_1 that is the signal of the UE1. The aforementioned decoding method of the UE1 may be different depending on a reception algorithm, such as CWIC, SLIC or ML.

If perfect cancellation for the signal of the UE0 is assumed, the capacity of the UE1 is the same as Equation 18.

$$C_N = \log_2\left(1 + \frac{\|\alpha H_1 p_1\|^2}{\|n_1\|^2}\right)$$ [Equation 18]

In this case, H_1 is a channel between the eNB and the UE1, α (0<α<1) is a power allocation factor for the UE1, $p_i$(i=0,1) is a normalized precoding vector for the i-th UE, and n_1 is a Gaussian noise vector added to a signal transmitted to the UE1.

Equation 18 shows the capacity of a near UE assuming that a UE (near UE) belonging to UEs grouped as a MUST pair and having better geometry perfectly cancels the signal of UE having poorer geometry (far UE).

The received signal of the UE0 is described. The received signal y_0 of the UE0 (FUE) may be expressed like Equation 19.

$$y_0 = H_0(\alpha p_1 s_1 + (1-\alpha) p_0 s_0) + n_0$$ [Equation 19]
$$= H_0(1-\alpha) p_0 s_0 + H_0 \alpha p_1 s_1 + n_0$$

In this case, H_0 is a channel between the eNB and the UE0, α (0<α<1) is a power allocation factor for the UE1, $p_i$(i=0,1) is a normalized precoding vector for the i-th UE, and n_0 is a Gaussian noise vector added to a signal transmitted to the UE0. s_i (i=0, 1) is a signal transmitted from the eNB to the i-th UE.

In general, the UE0 considers a signal superposed with its own signal to be interference and performs decoding.

Accordingly, the capacity of the UE0 may be expressed like Equation 20 similar to Equation 18.

$$C_F = \log_2\left(1 + \frac{\|(1-\alpha) H_0 p_0\|^2}{\|\alpha H_0 p_0\|^2 + \|n_0\|^2}\right)$$ [Equation 20]

In this case, H_0 is a channel between the eNB and the UE0, α (0<α<1) is a power allocation factor for the UE1, $p_i$(i=0,1) is a normalized precoding vector for the i-th UE, and n_0 is a Gaussian noise vector added to a signal transmitted to the UE0.

Equation 20 shows the capacity of a UE (far UE) that belongs to UEs grouped as a MUST pair and that has poorer geometry.

Figure 11:
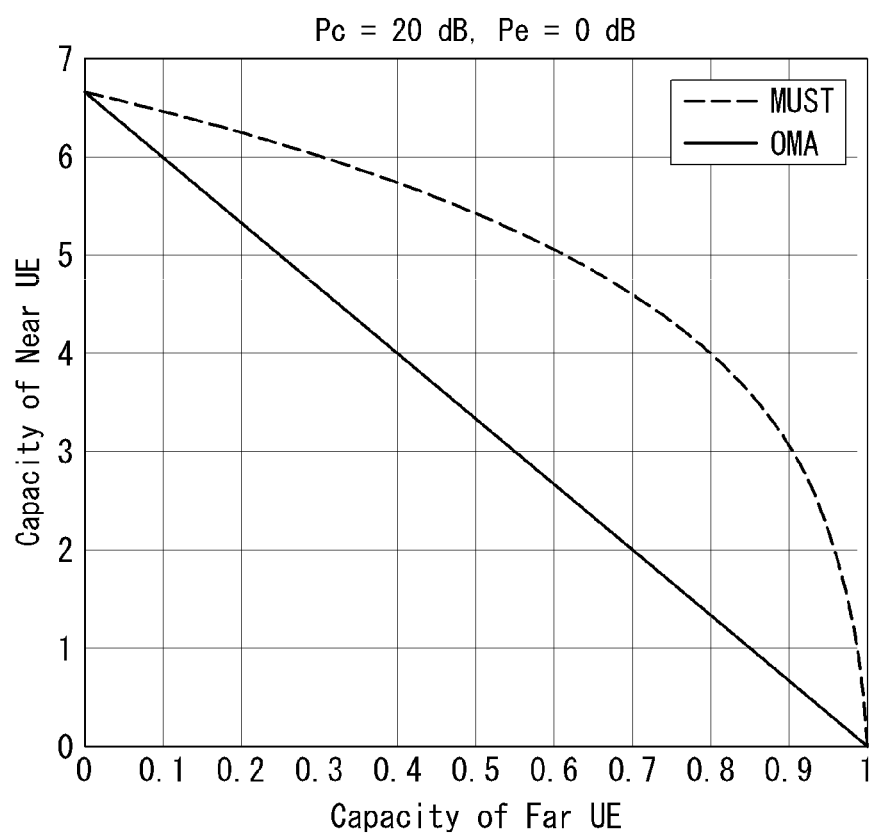
FIG. 11 is a diagram illustrating the capacity of a MUST scheme in a wireless communication system to which the present invention may be applied.

The capacity of a MUST scheme may be shown as in FIG. 11 using Equations 18 and 20.

FIG. 11 is a diagram illustrating the capacity of the MUST scheme in a wireless communication system to which the present invention may be applied.

FIG. 11 illustrates a case where the probability P_c of accurate decoding is 20 dB and a decoding error P_e is the capacity in 0 dB geometry.

The OMA scheme supports the UE0 and the UE1 using TDM or FDM compared to the MUST scheme.

The performance gain of OMA versus MUST expressed in FIG. 11 is a gain obtained as simultaneous transmission when a MUST pair shares a given time and frequency resource in a power domain.

In order to achieve the gain, a signal-to-interference-plus-noise-ratio (SINR) between the NUE and the FUE forming the MUST pair needs to be more than a specific value. Accordingly, there is a problem in that the probability that the MUST pair is formed (i.e., the probability that a UE forming a MUST pair will be searched for) is low.

It is expected that the performance gain of MUST will be increased as the probability that a MUST pair is formed becomes high. It is evident that the MUST pairing probability increases coverage of the UE1 having relatively great geometry is wider. In other words, the reason for this is that the MUST pair probability increases because expanding coverage of an NUE means that the number of NUEs having a better SINR increases to the extent that a MUST pair can be formed.

Accordingly, the present invention proposes a method capable of widening coverage of the UE1.

1) Joint Transmission (JT) for UE1 (i.e., NUE)

FIG. 12 is a diagram illustrating a case where the MUST scheme is applied in a multi-cell system according to an embodiment of the present invention.

FIG. 12(a) illustrates a case where the aforementioned MUST transmission scheme (refer to FIG. 9) has expanded to a multi-cell system and a two-cell system is taken into consideration. Furthermore, FIG. 12(a) illustrates a case where an eNB1 supports a near UE (NUE) and a far UE (FUE) using the MUST scheme and an eNB2 gives interference to the NUE and the FUE.

In FIG. 12(a), a solid line indicates a desired signal and a dotted line illustrates interference. α_1 (0<α_1<1) is a power allocation factor for the NUE of the eNB1. Furthermore, P means a P_max value, that is, maximum power that may be transmitted by the eNB.

FIG. 12(b) is a graph showing a received SINR according to the location of the UE (i.e., the location of the UE from the eNB1).

If UEs include UEs whose difference between the SINRs of the NUE and the FUE is a specific value or more (in one embodiment, a difference between the SINRs of the NUE and the FUE may be 12 dB), the MUST scheme can obtain an OMA versus performance gain. Coverage of the NUE may be restricted due to such a condition.

As one embodiment for a method capable of expanding coverage of an NUE, as in FIG. 13, the eNB2 may perform joint transmission (JT) along with the eNB1 for the NUE.

FIG. 13 is a diagram illustrating a MUST scheme using joint transmission from multiple cells for an NUE according to an embodiment of the present invention.

FIG. 13 illustrate a case where the aforementioned MUST transmission scheme (refer to FIG. 9) has expanded to a multi-cell system and a two-cell system is taken into consideration. Furthermore, FIG. 13 illustrate a case where an eNB1 supports a near UE (NUE) and a far UE (FUE) using the MUST scheme and an eNB2 gives interference to the NUE and the FUE.

In FIG. 13(a), a solid line indicates a desired signal and a dotted line indicates interference. α_1 (0<α_1<1) is a power allocation factor for the NUE of the eNB1, and α_2 (0<α_2<1) is a power allocation factor for the NUE of the eNB2. Furthermore, P means a P_max value, that is, maximum power that may be transmitted by the eNB.

As in FIG. 13(a), the eNB2 may perform JT with the eNB1 for the NUE using the power allocation factor of $α_2$.

In this case, the capacity equation of the NUE may be expressed like Equation 21. In this case, it was assumed that a signal from the eNB1 to the FUE had been perfectly cancelled.

$$C_N = \log_2\left(1 + \frac{\|\alpha_1 H_{11} p_{11} + \alpha_2 H_{12} p_{12}\|^2}{\|n_1\|^2}\right) \quad \text{[Equation 21]}$$

Furthermore, the capacity equation of the FUE may be expressed like Equation 22.

$$C_F = \log_2\left(1 + \frac{\|(1-\alpha_1) H_{01} p_{01}\|^2}{\|\alpha_1 H_{01} p_{01} + \alpha_2 H_{02} p_{02}\|^2 + \|n_0\|^2}\right) \quad \text{[Equation 22]}$$

In Equations 21 and 22, $H_{ij}$ means a channel from a j-th eNB to a UEi (in this case, a UE0 is an FUE and a UE1 is an NUE), $P_{ij}$ means a precoding vector from the j-th eNB to a UEi (in this case, a UE0 is an FUE and a UE1 is an NUE), and $\alpha_i$ indicates a power allocation factor for the UE1 (NUE) of an i-th eNB. n_i is a Gaussian noise vector added to a signal transmitted to the UEi.

When Equation 21 is compared with Equation 18, it may be seen that the denominator part of the capacity equation has increased as an effect of JT.

As shown in FIG. 13(b), the capacity of the NUE has increased (from 1302 to 1301), and thus coverage of the NUE capable of MUST has increased while maintaining a difference (e.g., 12 dB) of a specific SINR with respect to the FUE.

Figure 14:
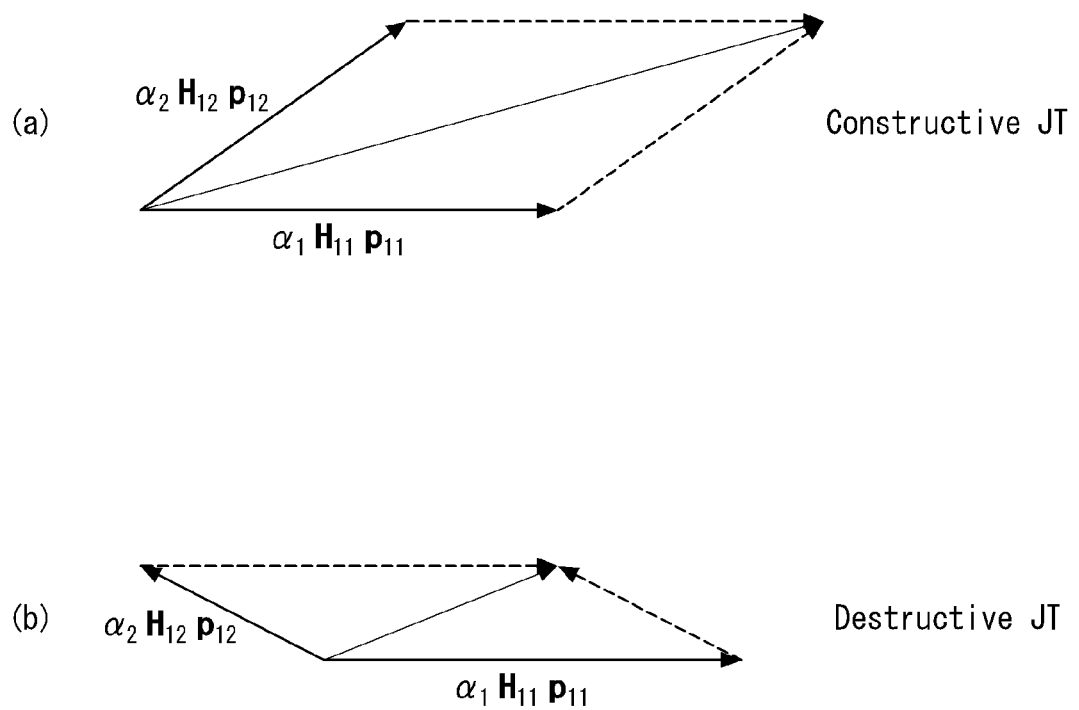
FIG. 14 is a diagram for illustrating a method of determining a precoding matrix for joint transmission according to an embodiment of the present invention.

In this case, when the JT operation between the two eNBs is performed, restriction may be applied to a signal subjected to the JT so that the signal is constructively formed as in FIG. 14.

FIG. 14 is a diagram for illustrating a method of determining a precoding matrix for joint transmission according to an embodiment of the present invention.

In FIG. 14, $H_{ij}$ means a channel from the j-th eNB to a UEi (in this case, a UE0 is an FUE and a UE1 is an NUE), $p_{ij}$ means a precoding vector from the j-th eNB to the UEi (in this case, the UE0 is an FUE and a UE1 is an NUE), and $\alpha_i$ is a power allocation factor for the UE1 (NUE) of an i-th eNB.

In FIG. 14(a), if a difference between the angles of two vectors corresponding to signals transmitted from the eNBs participating in JT to the UE is within 90°, JT may be configured so that the two vectors are constructive.

In contrast, as in FIG. 14(b), if a difference between the angles of two vectors corresponding to signals transmitted from the eNBs participating in JT to the UE is 90° or more, JT may be configured so that the two vectors are destructive.

a) For example, the eNB1 may configure the precoding vector so that the constructive JT is performed using two pieces of reported channel information, and may notify the eNB2 of the configured precoding vector through a backhaul (e.g., an X2 interface).

b) Alternatively, the UE may estimate a channel received from each eNB, may calculate a precoding vector suitable for constructive JT, and may directly report the calculated precoding vector to each eNB.

c) Alternatively, the eNB1 may restrict a codeword report forming destructive JT using codebook subset restriction.

Referring back to FIG. 13, the eNB2 that performs JT may have an influence on the FUE in addition to the NUE.

Accordingly, if $\alpha_2$ is properly adjusted, decoding performance of the FUE can also be improved.

That is, the capacity can be improved by adjusting $\alpha_2$ corresponding to the denominator part of Equation 22. Furthermore, since the eNB2 is geographically located close to the FUE, the intensity of interference from the eNB2 may be much greater than that of the NUE. Furthermore, the FUE can improve decoding performance by removing interference from the eNB2 in the situation in which the FUE has an interference cancellation ability.

In order to perform the aforementioned MUST process combined with JT, the eNB2 may notify the NUE/FUE of the $\alpha_2$ information.

MUST using the aforementioned JT of the UE1 may be suitable for a case where the MUST-pairing probability is low because the number of active UEs within a cell is small.

2) Joint Transmission (JT) for UE2 (i.e., FUE)

Contrary to the case described in 1), a case where JT is performed on an FUE is described.

FIG. 15 is a diagram illustrating a MUST scheme using joint transmission from multiple cells for an FUE according to an embodiment of the present invention.

FIG. 15 illustrates a case where the aforementioned MUST transmission scheme (refer to FIG. 9) has been expanded to a multi-cell system and a two-cell system is taken into consideration. Furthermore, an eNB1 supports a near UE (NUE) and a far UE (FUE) using the MUST scheme, and an eNB2 gives interference to the NUE and the FUE.

In FIG. 15(a), a solid line indicates a desired signal and a dotted line indicates interference. $\alpha\_1$ ($0<\alpha\_1<1$) is a power allocation factor for the NUE of the eNB1, and $\alpha\_2$ ($0<\alpha\_2<1$) is a power allocation factor for the FUE of the eNB2. Furthermore, P means a P_max value, that is, maximum power that may be transmitted by the eNB.

As illustrated in FIG. 15(a), a situation in which interference from the eNB2 is rarely present because the NUE has good geometry may be taken into consideration in the situation in which the number of active users is sufficiently many.

In this case, JT is performed toward an increase in the capacity of the FUE, and thus the capacity improvement (from 1502 to 1501) of the FUE is shown in FIG. 15(b).

In this case, the equation of the capacities of the NUE and the FUE is shown in Equation 23.

$$C_N = \log_2\left(1 + \frac{\|\alpha_1 H_{11} p_{11}\|^2}{\|\alpha_2 H_{12} p_{12}\|^2 + \|n_1\|^2}\right) \quad \text{[Equation 23]}$$

$$C_F = \log_2\left(1 + \frac{\|(1-\alpha_1) H_{01} p_{01} + \alpha_2 H_{02} p_{02}\|^2}{\|\alpha_1 H_{01} p_{01}\|^2 + \|n_0\|^2}\right)$$

In Equations 21 and 22, $H_{ij}$ means a channel toward a UEi in a j-th eNB (in this case, a UE0 is an FUE and a UE1 is an NUE). $p_{ij}$ means a precoding vector toward a UEi (in this case, a UE0 is an FUE and a UE1 is an NUE) in a j-th eNB. $\alpha\_1$ ($0<\alpha\_1<1$) is a power allocation factor for the NUE of the eNB1, and $\alpha\_2$ ($0<\alpha\_2<1$) is a power allocation factor for the FUE of the eNB2. n_i is a Gaussian noise vector added to a signal transmitted to the UEi.

The contents described in 1) may be easily expanded and applied to contents regarding the constructive construction of the JT signal in the numerator part of the FUE in Equation 23.

In other words, as in FIG. 14(b), if a difference between the angles of two vectors corresponding to signals transmitted from eNBs participating in JT to UE is 90° or more, the JT may be configured so that the two vectors are destructive.

a) For example, the eNB1 may set a precoding vector so that constructive JT is achieved using two pieces of reported channel information, and may notify the eNB2 of the precoding vector through a backhaul (e.g., X2 interface).

b) Alternatively, the UE may estimate a channel received from each eNB, may calculate a precoding vector suitable for constructive JT, and may directly report the precoding vector to each eNB.

c) Alternatively, the eNB1 may restrict a codeword report forming destructive JT using a codebook subset restriction.

In another embodiment of the present invention, MUST in both cells may be applied, which is described with reference to the following drawing.

Figure 16:
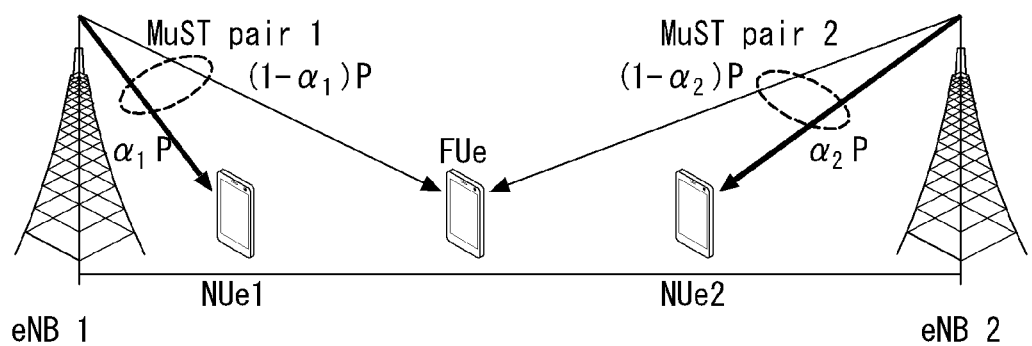
FIG. 16 is a diagram illustrating a MUST scheme using joint transmission from multiple cells for an FUE according to an embodiment of the present invention.

FIG. 16 is a diagram illustrating a MUST scheme using joint transmission from multiple cells for an FUE according to an embodiment of the present invention.

In FIG. 16, $\alpha\_1$ ($0<\alpha\_1<1$) is a power allocation factor for the NUE1 of an eNB1, and $\alpha\_2$ ($0<\alpha\_2<1$) is a power allocation factor for the NUE2 of an eNB2. Furthermore, P indicates a P_max value, that is, maximum power that may be transmitted by the eNB.

Referring to FIG. 16, in each cell, the eNB may perform MUST on a common FUE located at a cell edge, thereby being capable of improving the entire capacity of a system.

The scheme taken into consideration in 1) is a method which may be applied to improve MUST performance by increasing the pairing probability of MUST through the improvement of coverage of an NUE because the number of active users within a cell is small. Furthermore, the scheme taken into consideration in 2) is a method in which JT may be applied to the performance improvement of an FUE rather than coverage improvement of an NUE because the number of active users is sufficiently large and thus an NUE having good geometry is selected as a MUST pair.

Accordingly, an eNB may apply MUST JT mode switching regarding whether JT will be applied to an NUE or an FUE for each scenario or based on the number of active users.

a) The NUE and the FUE may feed information of CSI (i.e., PMI/CQI/RI) corresponding to the eNB1 and the eNB2 back to the eNB1.

The eNB1 calculates an MCS level, a precoding vector, and $\alpha_1,\alpha_2$ (i.e., MUST JT-related parameter) using the reported CSI (i.e., PMI/CQI/RI), and notifies the NUE and the FUE of them.

Furthermore, the eNB1 performs MUST JT by notifying the eNB2 of the information (i.e., MUST JT-related parameter) through the backhaul.

The eNB1 may semi-statically notify the UE (i.e., NUE and/or FUE) or the eNB2 of the information (i.e., MUST JT-related parameter), such as $\alpha_1,\alpha_2$.

Alternatively, the eNB1 may dynamically transmit the information (i.e., MUST JT-related parameter), such as $\alpha_1,\alpha_2$, to the UE (i.e., NUE and FUE) or the eNB2 when the MUST JT mode is dynamically changed (i.e., when a UE to which JT-involving MUST is applied).

A UE that belongs to MUST-paired UEs and to which JT-involving MUST is applied) may be notified of information of JT mode switching (i.e., information indicative of the UE) using a 1-bit indicator.

b) The NUE and the FUE may feed information of CSI (i.e., PMI/CQI/RI) back to each eNB. In this case, each eNB may calculate parameters necessary for MUST JT by exchanging the information through the backhaul. In this case, a specific eNB may calculate the information and transmit it to a counterpart eNB (i.e., a counterpart eNB participating in JT).

The eNB that has calculated the parameters necessary for MUST JT may semi-statically notify the UE (i.e., NUE and/or FUE) or a counterpart eNB of the information (i.e., MUST JT-related parameter), such as $\alpha_1,\alpha_2$. Alternatively, if the MUST JT mode is dynamically changed (i.e., if a UE to which JT-involving MUST is applied), the eNB may dynamically transmit the information (i.e., MUST JT-related parameter), such as $\alpha_1,\alpha_2$, to the UE (i.e., NUE and FUE) or the eNB2.

A UE that belongs to MUST-paired UEs and to which JT-involving MUST is applied may be notified of the information of JT mode switching (i.e., information indicative of the UE) using a 1-bit indicator.

For the cancellation of a MUST signal, the eNB notifies the NUE of power allocation information $\alpha_1$ or $\alpha_1,\alpha2$, thereby being capable of improving cancellation performance of a signal for the FUE.

Furthermore, if the FUE is reported to the eNB as a UE having the capability of removing a signal for the NUE, the FUE may be notified of $\alpha_1$ or $\alpha_1,\alpha_2$.

Furthermore, in the methods described in 1) and 2), any one of MUST and JT may be selected based on the geometry of a paired UE on which MUST is performed, and downlink data may be transmitted to the UE.

Figure 17:
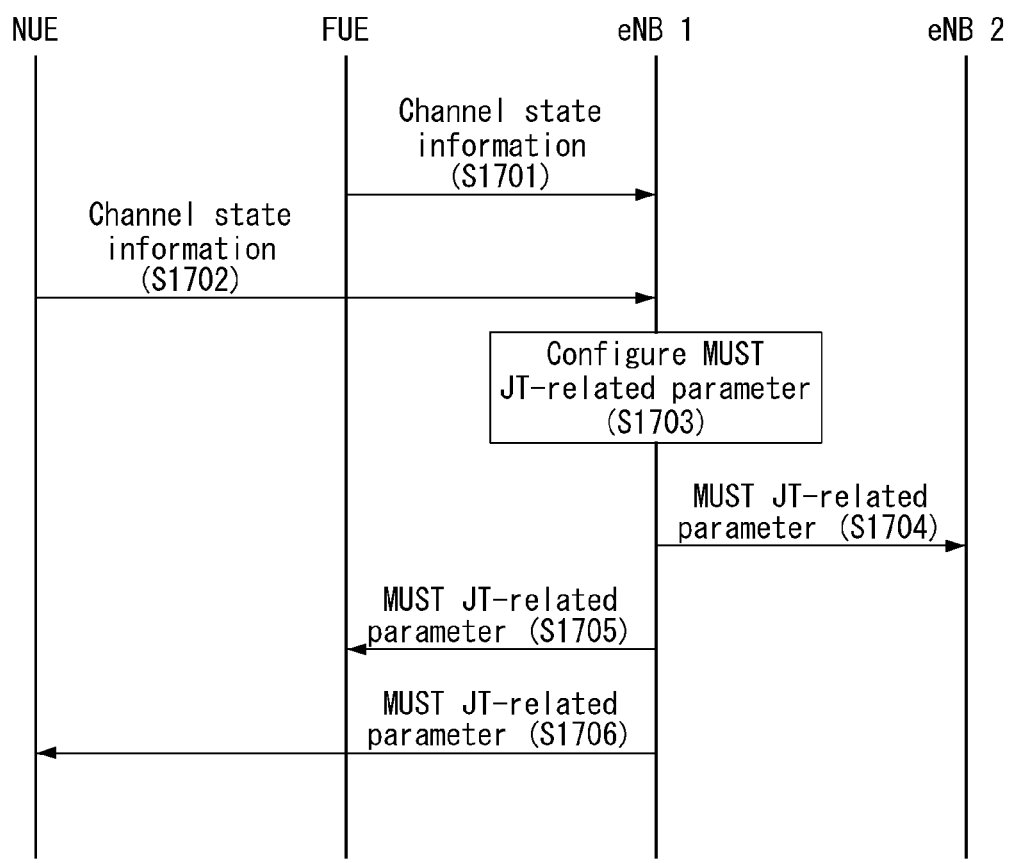
FIG. 17 is a diagram illustrating a method for performing multiuser superposition transmission involving joint transmission according to an embodiment of the present invention.

FIG. 17 is a diagram illustrating a method for performing multiuser superposition transmission involving joint transmission according to an embodiment of the present invention.

Referring to FIG. 17, an eNB 1 receives channel state information (CSI) from each of an NUE and/or an FUE that have been MUST-paired (S1701, S1702).

In this case, the CSI transmitted by the NUE may include first CSI of the first eNB participating in joint transmission and second CSI of a second eNB participating in the joint transmission.

Furthermore, likewise, the CSI transmitted by the FUE may include first CSI of the first eNB participating in the joint transmission and second CSI of a second eNB participating in the joint transmission.

In this case, the first CSI and/or the second CSI may include an RI, a CQI, a PMI, etc.

In the case of the PMI included in the first CSI and/or the second CSI, the PMI may indicate a precoding matrix which may be applied to perform MUST involving joint transmission on a MUST-paired UE.

In particular, as in the description according to the example of FIG. 14, the PMI may indicate a precoding matrix that enables a signal subjected to joint transmission from the first eNB and the second eNB is constructive.

Furthermore, as in the description according to the example of FIG. 14, a precoding matrix may be selected from a codebook except a codeword that makes destructive the signal subjected to joint transmission from the first eNB and the second eNB.

The eNB 1 that has received the CSI from the MUST-paired UE configures a parameter necessary to perform MUST involving joint transmission (i.e., MUST JT-related parameter) based on the received CSI (i.e., the first CSI of the first eNB and the second CSI of the second eNB) (S1703).

In this case, the MUST JT-related parameter may include one or more of power allocation factors (a power allocation factor applied by the first eNB and/or a power allocation factor applied by the second eNB) for performing MUST involving joint transmission on a MUST-paired UE and an MCS level.

Furthermore, the MUST JT-related parameter may further include a precoding matrix for performing MUST involving joint transmission on the MUST-paired UE.

In particular, as in the description according to the example of FIG. 14, the precoding matrix may be configured so that the signal subjected to joint transmission from the first eNB and the second eNB is constructively formed.

The eNB 1 transmits the parameter (i.e., MUST JT-related parameter) necessary to perform MUST involving joint transmission to the eNB 2 through a backhaul (e.g., X2 interface) (S1704).

Furthermore, the eNB 1 may transmit the parameter (i.e., MUST JT-related parameter) necessary to perform MUST involving joint transmission to the MUST-paired UE (i.e., NUE and/or FUE) (S1705, S1706).

Meanwhile, the eNB 1 may transmit an indicator indicating whether the JT-involving MUST is applied to the NUE (1) case or whether the JT-involving MUST is applied to the FUE (2) case) to the MUST-paired UE (i.e., NUE and/or FUE) (along with or independently of the MUST JT-related parameter).

The operation (steps S1704, S1705 and S1706) of transmitting the MUST JT-related parameter may be semi-statically performed or may be performed whenever a UE to which the JT-involving MUST is applied is changed (i.e., a change from the NUE to the FUE or a change from the FUE to the NUE).

Meanwhile, the steps of receiving the CSI from the MUST-paired UE has been illustrated in order of steps S1701 and S1702, for convenience of description, but the present invention is not limited to the illustrated order.

Furthermore, the steps of transmitting the MUST JT-related parameter has been illustrated in order of steps S1704, S1705, and S1706, for convenience of description, but the present invention is not limited to the illustrated order.

Figure 18:
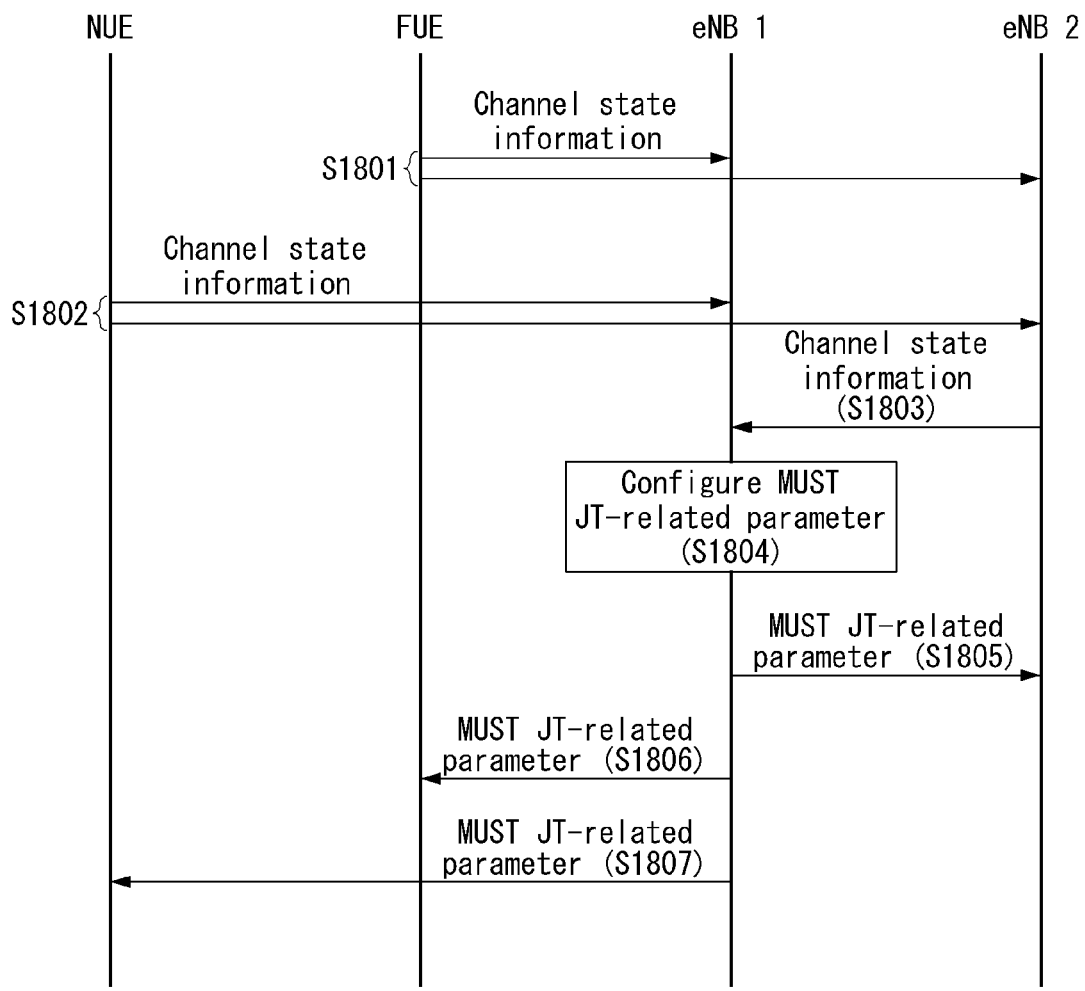
FIG. 18 is a diagram illustrating a method for performing multiuser superposition transmission involving joint transmission according to an embodiment of the present invention.

FIG. 18 is a diagram illustrating a method for performing multiuser superposition transmission involving joint transmission according to an embodiment of the present invention.

Referring to FIG. 18, an eNB 1 and eNB2 participating in joint transmission receive channel state information (CSI) from each of MUST-paired FUEs (S1801).

Furthermore, the eNB 1 and the eNB2 participating in joint transmission receive channel state information (CSI) from each of MUST-paired NUEs (S1802).

In this case, the first CSI and/or the second CSI may include an RI, a CQI, a PMI, etc.

In the case of the PMI included in the first CSI and/or the second CSI, the PMI may indicate a precoding matrix which may be applied to perform MUST involving joint transmission on the MUST-paired UE.

In particular, as in the description according to the example of FIG. 14, the PMI may indicate a precoding matrix that enables a signal subjected to joint transmission from the first eNB and the second eNB to be constructive.

Furthermore, as in the description according to the example of FIG. 14, a precoding matrix may be selected from a codebook except a codeword that makes destructive the signal subjected to joint transmission from the first eNB and the second eNB.

The eNB 2 transmits the second CSI received from the NUE and/or the FUE to the eNB 1 through a backhaul (e.g., X2 interface) (S1803).

The eNB 1 configures a parameter (i.e., MUST JT-related parameter) necessary to perform MUST involving joint transmission based on the first CSI and the second CSI (S1804).

In this case, the MUST JT-related parameter may include one or more of power allocation factors (a power allocation factor applied by the first eNB and/or a power allocation factor applied by the second eNB) for performing MUST involving joint transmission on a MUST-paired UE and an MCS level.

Furthermore, the MUST JT-related parameter may further include a precoding matrix for performing MUST involving joint transmission on the MUST-paired UE.

In particular, as in the description according to the example of FIG. 14, the precoding matrix may be configured so that the signal subjected to joint transmission from the first eNB and the second eNB is constructively formed.

The eNB 1 transmits the parameter (i.e., MUST JT-related parameter) necessary to perform MUST involving joint transmission to the eNB 2 through a backhaul (e.g., X2 interface) (S1805).

Furthermore, the eNB 1 may transmit the parameter (i.e., MUST JT-related parameter) necessary to perform MUST involving joint transmission to the MUST-paired UE (i.e., NUE and/or FUE) (S1806, S1807).

Meanwhile, the eNB 1 may transmit an indicator indicating whether the JT-involving MUST is applied to the NUE (1) case or whether the JT-involving MUST is applied to the FUE (2) case) to the MUST-paired UE (i.e., the NUE and/or the FUE) (along with or independently of the MUST JT-related parameter).

The operations (steps S1704, S1705, and S1706) of transmitting the MUST JT-related parameter may be semi-statically performed or may be performed whenever a UE to which the JT-involving MUST is applied is changed (i.e., a change from the NUE to the FUE or a change from the FUE to the NUE).

Meanwhile, the steps of receiving the CSI from the MUST-paired UE has been illustrated in order of steps S1701 and S1702, for convenience of description, but the present invention is not limited to the illustrated order.

Furthermore, the steps of transmitting the MUST JT-related parameter has been illustrated in order of steps S1704, S1705, and S1706, for convenience of description, but the present invention is not limited to the illustrated order.

General Apparatus to which the Present Invention May be Applied

Figure 19:
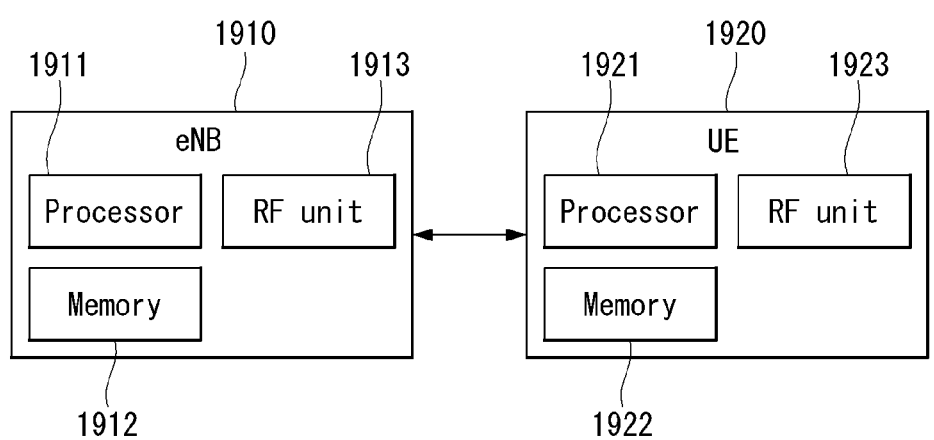
FIG. 19 illustrates a block diagram of a wireless communication apparatus according to an embodiment of the present invention.

FIG. 19 illustrates a block diagram of a wireless communication apparatus according to an embodiment of the present invention.

Referring to FIG. 19, the wireless communication system includes an eNB 1910 and multiple UEs 1920 located within the area of the eNB 1910.

The eNB 1910 includes a processor 1911, a memory 1912, and a radio frequency (RF) unit 1913. The processor 1911 implements the functions, processes and/or methods proposed in FIGS. 1 to 18. The layers of a wireless interface protocol may be implemented by the processor 1911. The memory 1912 is connected to the processor 1911 and stores a variety of type of information for driving the processor 1911. The RF unit 1913 is connected to the processor 1911 and transmits and/or receives radio signals.

The UE 1920 includes a processor 1921, a memory 1922, and an RF unit 1923. The processor 1921 implements the functions, processes and/or methods proposed in FIGS. 1 to 18. The layers of a radio interface protocol may be implemented by the processor 1921. The memory 1922 is connected to the processor 1921 and stores a variety of type of information for driving the processor 1921. The RF unit 1923 is connected to the processor 1921 and transmits and/or receives radio signals.

The memory 1912, 1922 may be located inside or outside the processor 1911, 1921 and may be connected to the processor 1911, 1921 by various well-known means. Furthermore, the eNB 1910 and/or the UE 1920 may have a single antenna or multiple antenna.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The present invention has been described based on an example in which it is applied to the 3GPP LTE/LTE-A systems, but may be applied to various wireless communication systems in addition to the 3GPP LTE/LTE-A systems.

The invention claimed is:

1. A method for a first eNodeB (eNB) to perform multiuser superposition transmission (MUST) involving joint transmission in a wireless communication system, the method comprising:
   receiving first channel state information (CSI) of a first eNB participating in joint transmission from a MUST-paired user equipment (UE);
   configuring a parameter necessary to perform the MUST involving joint transmission to the MUST-paired UE based on the first CSI and second CS of a second eNB participating the joint transmission; and
   transmitting the parameter to the MUST-paired UE and the second eNB.

2. The method of claim 1, further comprising:
   receiving the second CSI from the MUST-paired UE or the second eNB.

3. The method of claim 1, further comprising:
   transmitting to the MUST-paired UE an indicator indicating whether the MUST involving joint transmission is applied to a far UE (FUE) remote from the first eNB or to a near UE (NUE) from the first eNB among the MUST paired UEs.

4. The method of claim 1, wherein the parameter comprises one or more of a power allocation factor for performing the MUST involving joint transmission on the MUST-paired UE and a modulation and coding scheme (MCS) level.

5. The method of claim 1, wherein:
   the parameter further comprises a precoding matrix for performing the MUST involving joint transmission on the MUST-paired UE, and
   the precoding matrix is configured so that a signal to be jointly transmitted from the first eNB and the second eNB is constructively formed.

6. The method of claim 1, wherein:
   the first CSI and the second CSI comprise a precoding matrix indicator (PMI) indicating a precoding matrix for performing the MUST involving joint transmission on the MUST-paired UE, and
   the PMI indicates the precoding matrix so that a signal subjected to joint transmission from the first eNB and the second eNB is constructive.

7. The method of claim 1, wherein:
   the first CSI and the second CSI comprise a precoding matrix indicator (PMI) indicating a precoding matrix for performing the MUST involving joint transmission on the MUST-paired UE, and
   the precoding matrix is selected from a codebook except codeword enabling a signal subjected to joint transmission from the first eNB and the second eNB to be destructive.

8. The method of claim 1, wherein the parameter is semi-statically transmitted.

9. The method of claim 1, wherein when a UE belonging to the MUST-paired UEs and to which the MUST involving joint transmission is applied is changed, the parameter is transmitted.

10. A first eNodeB (eNB) for performing joint transmission involving multiuser superposition transmission (MUST) in a wireless communication system, the first eNB comprising:
    a radio frequency (RF) unit for transmitting/receiving a radio signal; and a processor controlling the RF unit,
wherein the processor is configured to:
receive first channel state information (CSI) of the first eNB participating in joint transmission from a MUST-paired user equipment (UE);
configure a parameter necessary to perform MUST involving joint transmission in the MUST-paired UE based on the first CSI and second CS of a second eNB participating the joint transmission; and
transmit the parameter to the MUST-paired UE and the second eNB.

* * * * *